United States Patent [19]
Kidd

[11] Patent Number: 5,325,312
[45] Date of Patent: Jun. 28, 1994

[54] INTELLIGENT PRESSURE PROBE

[75] Inventor: Roy E. Kidd, Clayton, Ind.

[73] Assignee: Emerson Electric Co., St. Louis, Mo.

[21] Appl. No.: 30,982

[22] Filed: Mar. 12, 1993

[51] Int. Cl.$^5$ .................... G06F 15/20; G08B 19/00
[52] U.S. Cl. .................................. 364/558; 340/605
[58] Field of Search .............. 364/558, 465, 556; 73/4 R, 37, 40; 340/605, 626

[56] References Cited

U.S. PATENT DOCUMENTS

| | | | |
|---|---|---|---|
| 4,586,033 | 4/1986 | Andrejasich et al. | 340/603 |
| 4,644,354 | 2/1987 | Kidd | 73/49.2 X |
| 4,721,950 | 1/1988 | Andrejasich et al. | 340/603 |
| 4,736,193 | 4/1988 | Slocum et al. | 340/522 |
| 4,835,522 | 5/1989 | Andrejasich et al. | 340/521 |
| 4,835,717 | 5/1989 | Michel et al. | 364/558 |
| 4,855,714 | 8/1989 | Clarkson et al. | 340/521 |
| 4,876,530 | 10/1989 | Hill et al. | 340/605 |
| 4,947,352 | 8/1990 | Jenkins | 364/558 |
| 5,086,403 | 2/1992 | Slocum et al. | 364/558 |

OTHER PUBLICATIONS

Pollulert Brochure "FD200PSRA Line Pressure Probe" Oct. 90.
Pollulert Manual "Installation and Oper. Instructions for Leak and Vapor Det. Prober" Dec. '91.
E.P.A. Regulation 40 C.F.R. §§280,40–280.45.

Primary Examiner—Kevin J. Teska
Attorney, Agent, or Firm—Robert F. Meyer; Eric R. Waldkoetter

[57] ABSTRACT

A pressure transducer, a microprocessor, and associated electronics are enclosed in a probe housing which may be attached to a liquid product line with the pressure transducer responsive to the pressure of the liquid in the liquid product line to provide an electrical signal representative of the pressure. The probe microprocessor contains a software program to detect leakage from a pressurized liquid product line in which the liquid is subject to a pressure increase caused by thermal contraction. The probe also has the capability to directly operate a product pump with a signal connection between the probe and the pump.

4 Claims, 8 Drawing Sheets

INTELLIGENT PRESSURE PROBE

BACKGROUND

This invention relates to a hydrocarbon dispensing line pressure transducer or pressure probe for sensing a leak in the dispensing line. More specifically, this invention is an improvement on U.S. Pat. No. 4,835,717 that is hereby incorporated by reference.

A typical use for a hydrocarbon product dispensing line pressure probe is in a vehicular service station that dispenses fuel. In a vehicular service station, it is common for fuel to be stored in large underground storage tanks and pumped through a product dispensing line to a dispenser. The dispenser typically has a switch that is turned on by a customer to activate a pump for pumping fuel through the product line into a vehicle. When the customer has completed dispensing fuel, the dispensing switch is turned off which also turns off the pump. A check valve in the product dispensing line prevents fuel from draining out of the product dispensing line when the pump is turned off and maintains the product under pressure in the product dispensing line. A pressure relief valve built into the pump reduces product line pressure to about 11-15 pounds per square inch PSI (0,759-1.034 Bar) after the dispensing switch is turned off.

The product dispensing line also has a line pressure probe installed in a "T" connection in the product dispensing line for sensing product line pressure. In the past, line pressure probes have been designed to detect large scale leaks on the order of three (3) or more gallons (7.78 or more liters) per hour. When detecting large scale leaks, thermally induced pressure variations are less significant.

Recently, the Environmental Protection Agency ( E. P. A. ) has required that small scale leaks measured in fractions of a gallon (liter) per hour must be detectable in product dispensing lines. The Environmental Protection Agency ( E. P. A. ) requires either an annual line tightness test with a required detection rate of "0.1 gallon per hour [0.379 liters] leak rate at one and one-half times the operating pressure," 40 C. F. R. § 280.44 (b) (1988) , or a monthly line tightness test with a required detection rate of "0.2 gallon per hour [0.757 liters] leak rate or a release of 150 gallons [567.81 liters] within a month with a probability of detection of 0.95 and a probability of false alarm of 0.05." 40 C. F. R. § 280.43 (h) (l) (1988).

With the E. P. A. mandated line tightness test standards, thermally induced pressure variations became significant, and a there was a need to distinguish between thermally induced pressure changes and an actual product dispensing line leak. Some previous hydrocarbon leak detection systems, such as that described in U.S. Pat. No. 4,835,717, have employed a resistive thermal device, such as a thermistor, to sense product temperature in an effort to compensate for thermally induced pressure changes. Use of a resistive thermal device can create inaccuracies because product temperature is only measured at one location, and product temperature can vary many degrees over the length of a product line.

Previous hydrocarbon leak detection systems have determined whether thermal contraction was present by measuring pressure at various times depending upon product line pressure.

Previous hydrocarbon leak detection systems test for thermal contraction to distinguish a pressure change caused by a leak from a pressure change caused by thermal contraction. If thermal contraction is tested, a leak which varies with thermal conditions could appear as thermal contraction. For instance, product line elbows are typically made from a thicker material than the product line. If the liquid product is at a different thermal differential from the product line, the product line would undergo thermal contraction or expansion more quickly than the product line elbow because of the greater mass of the product line elbow. If there was a leak in the fitting between the product line elbow and the product line, the leak rate could vary with temperature changes and appear as thermal contraction.

What is needed is an intelligent pressure probe with thermal compensation that measures pressure at defined time intervals by changing a threshold pressure for determining failure based upon thermally induced product contraction.

SUMMARY

The present invention is directed to a method that satisfies the need to distinguish thermally induced pressure changes from a leak when performing a pressure test of a product line.

I have invented a method and apparatus of detecting leakage from a pressurized product line in which the liquid is subject to a pressure decrease caused by thermal contraction. The method begins with providing a line pressure probe having an electrical connection to a pump relay and a software program for carrying out the following steps. A line tightness test is performed by pressurizing a product line and measuring the pressure with a pressure transducer such as a line pressure probe. The line pressure probe contains a microprocessor and computer program that compares the product line pressure reading against predetermined decision criteria.

If the comparison indicates the line tightness test was successful, the test result is a "pass" and it is also determined that there are no thermally induced pressure changes. If the comparison indicates the line tightness test was a failure, the test result is a "fail" and it is determined there may be thermally induced pressure changes or a leak.

When a line tightness test is failed, the program assumes that thermal contraction is causing failure and the line tightness test is repeated a number of cycles to permit the liquid in the product line to thermally stabilize enough to distinguish thermally induced pressure changes from a leak. During subsequent line tightness tests, if a test is passed then the line tightness test is no longer repeated and a "pass" is reported. If, however, after the line tightness test has been completed the number of cycles to permit the liquid in the product line to stabilize and the line tightness test is still failed, then "fail" is reported indicating there is a leak.

The line tightness test is initiated each time product is pumped for dispensing. If the pump operates for more than a predetermined period of time, a determination is made that product is being dispensed, and a line tightness test is not being conducted. Upon completion of product dispensing, the complete test sequence to include a catastrophic and gross leak test as well as the line tightness test is initiated. If at any time during the test sequence, the pump is operated for more than a predetermined period of time a determination is made that product is being dispensed and the test sequence is halted. Upon the test sequence being halted, test variables are reset, so the test sequence will begin from the beginning when the test sequence is again initiated.

The performance of line tightness tests, is monitored to determine if a line tightness test has been passed within a predetermined number of days. If a line tightness test is passed within a predetermined number of days, periodic product dispensing can continue without the need to halt dispensing for performance of a line tightness test.

The apparatus for detecting leakage from a pressurized product line in which the liquid is subject to a pressure decrease caused by thermal contraction follows. There is a pressure transducer for providing an electrical signal representative of the pressure in a liquid conduit; a digital storage means for storing a plurality of decision criteria related to conditions of said liquid storage and dispensing system and the pressure in the conduit; a digital logic means responsive to the pressure signal and communicating with the digital storage means for providing an output signal indicative of one or more conditions of said liquid storage and dispensing system relative to the pressure signal; a probe housing for enclosing the pressure transducer, digital storage means and digital logic means including means for attaching the probe housing to a liquid conduit with the pressure transducer responsive to the pressure of the liquid in the conduit; and, a control wire for electrically connecting the digital logic means to a pump relay, so the digital logic means can directly activate a pump to pressurize the liquid conduit. The control wire for electrically connecting the digital logic means to a pump relay is electrically isolated from the pump relay by an optical isolator to prevent current flow from the pump relay back to the line pressure probe.

The following are objects of the invention. Provide a low-cost modification to an existing line pressure probe to comply with E. P. A. leak detection accuracy standards. Provide a pressure probe with the capability to distinguish between thermally induced pressure changes and a leak. Modify an existing line pressure probe to directly control the pump.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE DRAWINGS

Figure 1:
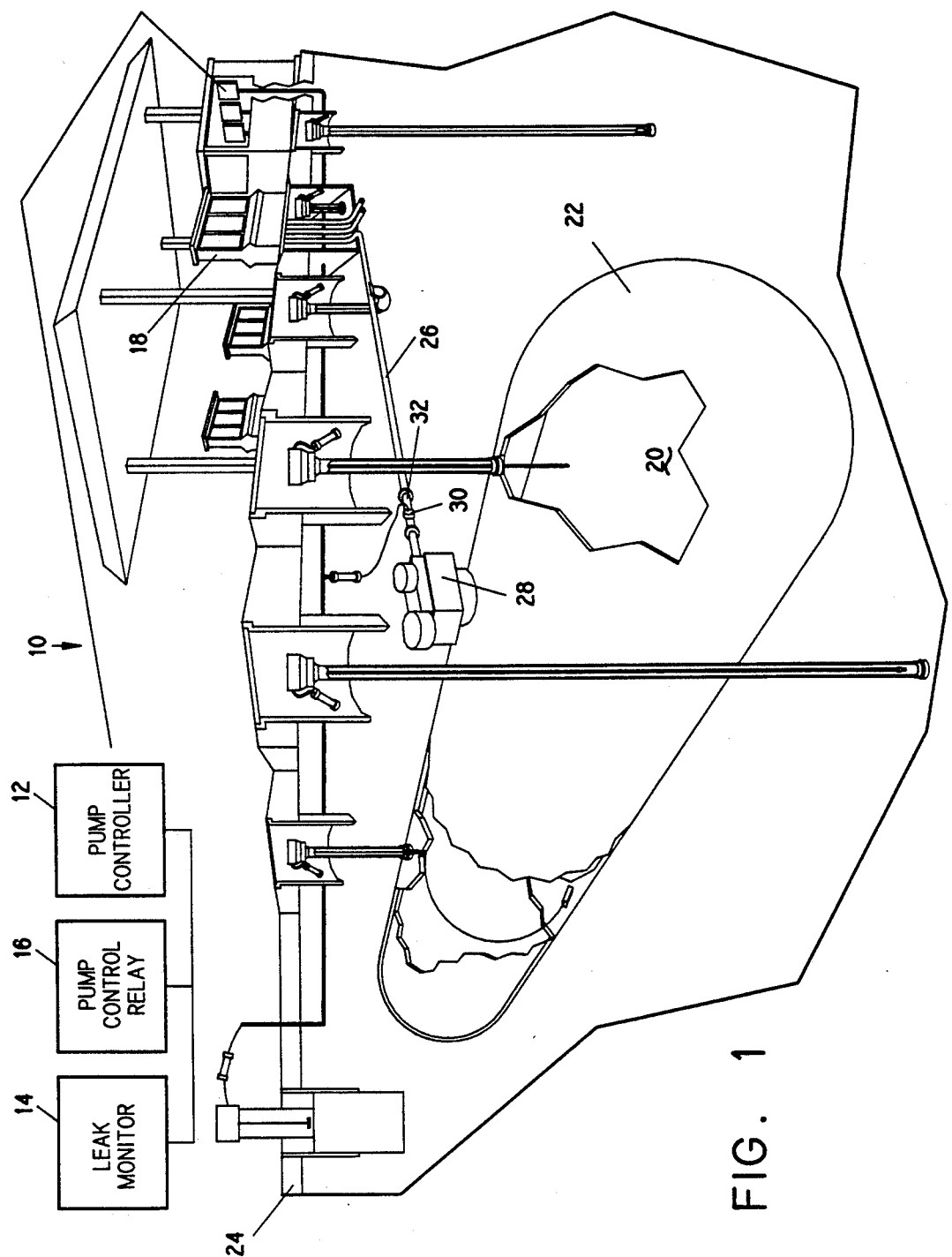
FIG. 1 shows an installed leak detection system.

Overview of a typical leak detection system. Referring to FIG. 1, an installed leak detection system 10 of the type commonly found in fuel service stations is shown. The fuel 20 is stored in a underground storage tank 22 which is typically buried beneath a concrete slab 24. A product line 26, also referred to as a liquid conduit, extends from the underground tank 22 to a dispenser 18 which is mounted on the slab 24. A submersible pump 28, such as a Red Jacket ® Electronics petroleum pump part no. P75S1 available from the Marley Pump Co., 5800 Foxridge Dr., 66202, P. O. Box 2973, Mission, Kans. 66202 is mounted to the storage tank 22. The pump 28 is operated by a pump control relay 16, such as a Red Jacket ® Electronics pump control relay part no. 880030, to pump the fuel 20 through the product line 26 to the dispenser 18. A check valve (not shown) prevents liquid from the product line 26 from draining back into the underground storage tank 22 when the submersible pump 28 is turned off.

Monitoring of pressure in a product line 26, such as a service station fuel dispensing pipe, can be accomplished with a line pressure probe, also referred to as a pressure transducer, such as that described in U.S. Pat. No. 4,835,717 or Pollulert ® model no. PSRA200 available from Pollulert ®, 2831 Waterfront Parkway East Drive, Indianapolis, Ind. 46224, is installed in "T" connection 32 in the product line 26 for providing an electrical signal representative of the pressure in a liquid conduit 26.

Figure 2:
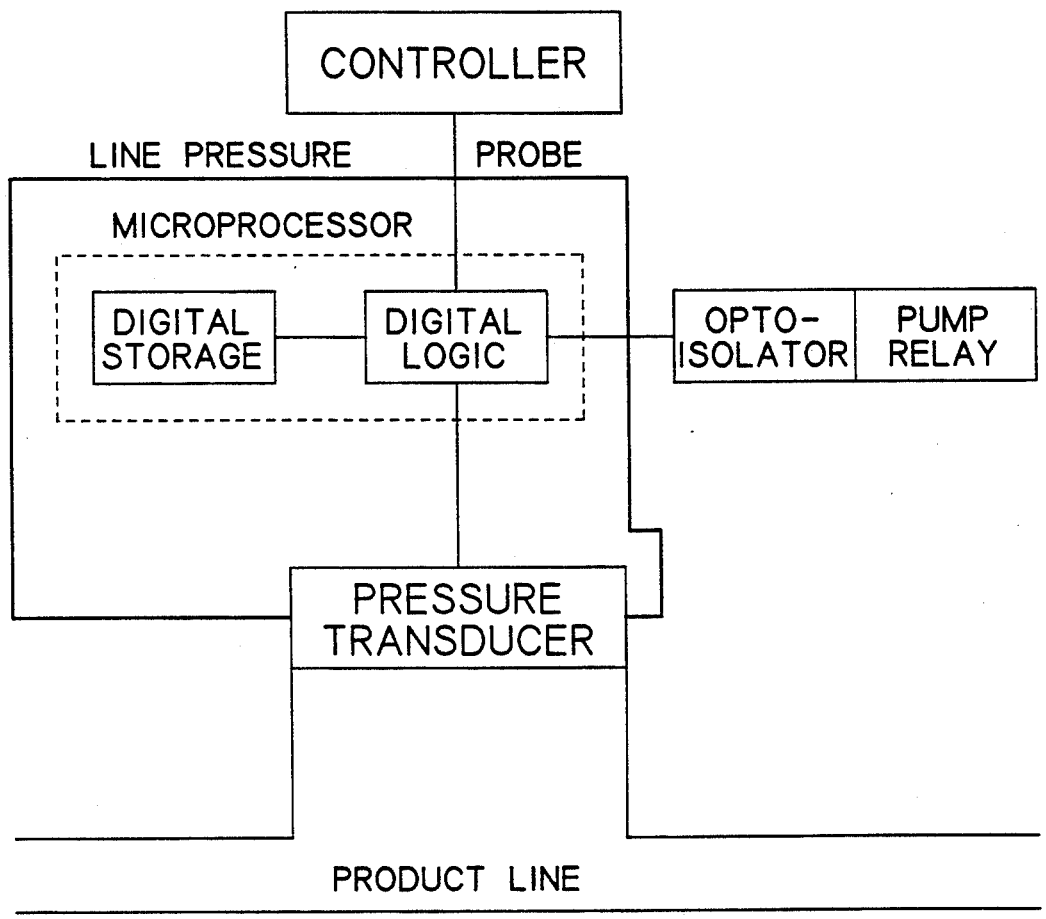
FIG. 2 shows a block diagram of a line pressure probe.

Referring to FIG. 2, the line pressure probe 30 microprocessor 34 contains a digital storage means 36, a digital logic means 38, and a pressure transducer 40 all carried in a probe housing (see U.S. Pat. No. 4,835,717 FIGS. 1 and 2 previously incorporated by reference). The digital storage means 36 is for storing a plurality of decision criteria related to conditions of said liquid storage and dispensing system and the pressure in the conduit 26.

The pressure probe digital logic means 38 is responsive to a pressure signal and communicates with the digital storage means 36 for providing an output signal indicative of one or more conditions of said liquid storage and dispensing system relative to the pressure signal. The digital logic means 38 is wired to a leak detection controller 14, also known as a leak monitor, and provides a binary signal over a four wire address line to the leak monitor 14 to report product line 26 pressure. A signal path 42 can be provided for connecting the digital logic means 38 to a pump relay 16, so the digital logic means 38 can directly activate a pump 28 to pressurize the liquid conduit 26.

The microprocessor based leak monitor 14 such as that described in U.S. Pat. No. 4,736,193 or Pollulert ® model no. FD103, processes signals from pressure probe 30 and other transducers in accordance with a computer program to determine and report the status of the fuel storage and distribution system.

The pressure probe digital logic means 38 is also connected to the pump relay 16 by a signal path 42 from an output port (not show) on the digital logic means 38 which is typically a Motorola part no. 68HC705C4CFN available from Motorola, Box 20912, Phoenix, Ariz. 85036, to an optical isolator 44 on the pump relay 16. The signal path 42 for connecting the digital logic means 38 to the pump relay 16 is isolated from the pump relay 16 to prevent flow of current from the pump relay 16 to the line pressure probe 30. The signal path 42 can be an electrical wire or a fiber optic strand. A fiber optic strand signal path would eliminate the need for the signal path to be installed in a protective conduit. The optical isolator 44 is typically opto-relay such as a Grayhill part no. 70S2-04-B-03-V available from Grayhill, Inc., 562 Hillgrove Avenue, P. O. Box 10370 La Grange, Ill. 60525.

The line pressure probe 30 housing (see U.S. Pat. No. 4,835,717 FIGS. 1 and 2, previously incorporated by reference) is for enclosing the pressure transducer, digital storage means and digital logic means including means for attaching the probe housing to a liquid conduit 26 with the pressure transducer 40 responsive to the pressure of the liquid in the conduit 26.

Referring to FIGS. 1-4, an overview of the major steps in the software program follows. When power is first applied to the line pressure probe 30, the software program initializes 46. During initialization, variables are set and housekeeping functions are performed. After initialization 46, the line pressure probe 30 waits until the probe 30 determines that a dispense has occurred 48 by sensing that the product line 26 pressure has increased.

When the line pressure probe 30 senses that the dispense has stopped 50, a test sequence which includes a gross leak test 52, a catastrophic leak test 54 and a line tightness test 56, sometimes referred to as a precision leak test, is begun. At the conclusion of the test sequence, the pump 28 is briefly operated to pressurize the product line 26, and the test sequence is restarted.

The pump 28 is activated by the line pressure probe 30 which directly controls the pump 28 by a wire 42 connecting the line pressure probe 30 to the pump relay 16. The wire 42 is connected from the line pressure probe 30 microprocessor output port (not shown) to an opto-isolator 44 which in turn controls the pump relay 16. The opto-isolator 44 serves to isolate the line pressure probe 30 from the pump relay 16 to prevent current flow from the pump relay 16 to the line pressure probe 30 and to comply with Underwriters Laboratories ® standard 913.

At any time during the test sequence a dispense is sensed, the test sequence is aborted. Once the dispense has stopped, the test sequence is restarted.

The catastrophic leak test 54 conducted by the line pressure probe 30 determines if there is a leak greater than or equal to ten (10) gallons (37.85 liters) per hour. Although currently the catastrophic leak test 54 is not required by the E. P. A., the purpose of the catastrophic test 54 is to quickly detect a massive leak. The catastrophic leak test is accomplished by monitoring pressure in the product line 26 for a period of time and if the pressure decreases below a predetermined value, then the catastrophic test 54 is failed and "leak" is reported; otherwise, if the pressure does not decrease below a predetermined value then the catastrophic test 54 is passed and the line pressure probe 30 software continues with the gross leak test 52.

The gross leak test 52 conducted by the line pressure probe 30 is the next test in the test sequence to determine if there is a leak greater than or equal to three (3) gallons (11.36 liters) per hour at 10 PSI (0.69 Bar) within one (1) hour. The E. P. A. specifies the gross leak test in 40 C. F. R. § 289.44(a)(1988). The gross leak test 52 is accomplished by monitoring pressure in the product line 26 for a period of time and if pressure decreases below a predetermined value, then the gross test 52 is failed and "leak" is reported; otherwise, if the pressure does not decrease below a predetermined value then the gross test 52 is passed and the line pressure probe 30 software continues with the line tightness test 56.

The monthly line tightness test 56 conducted by the line pressure probe 30 is the final test in the test sequence to determine if there is a leak greater than or equal to 0.2 gallons (0.757 liters) per hour with a probability of detection of 0.95 and a probability of false alarm of 0.05. The E. P. A. specifies the line tightness test in 40 C. F. R. §§ 280.44(b) and 280.43(h)(1)(1988).

Performing a line tightness test 56, sometimes referred to as a precision leak test, is accomplished by pressurizing a product line 26 and comparing the pressure reading against predetermined decision criteria. The product line 26 is repressurized by the line pressure probe 30 signal over a wire 42 to the opto-isolator 44 in the pump relay 16 to jog the pump 28 for approximately five (5) seconds. The decision criteria are stored in the line pressure probe microprocessor 34.

Since the line tightness test 56 is required to detect a much smaller leak than either the catastrophic 54 or gross leak tests 52, thermal contraction can create false alarms. If the line tightness test 56 is successful passed, "pass" is reported. If there is any thermal contraction induced pressure variation, the pressure variation is not great enough to create the possibility of a false alarm. Upon passing a line tightness test 56, the line pressure probe 30 once again waits for a dispense to occur and then the test sequence is restarted.

Figure 8:
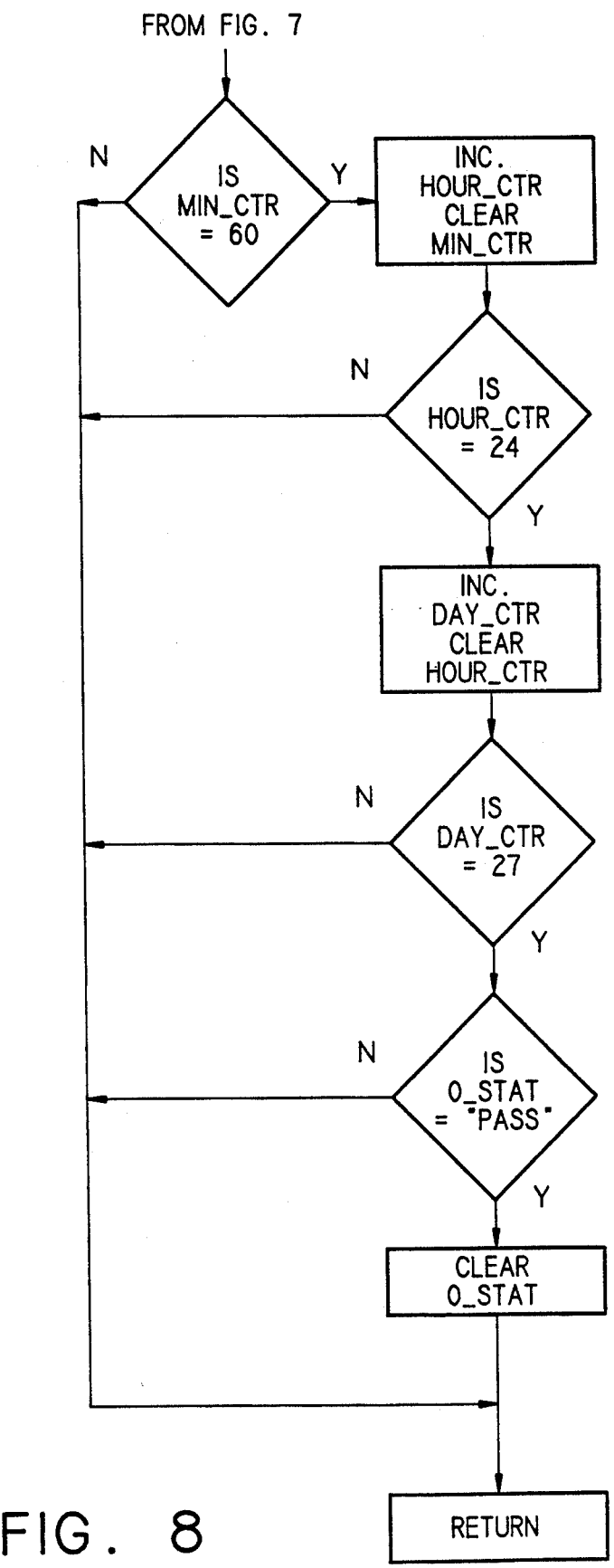
FIG. 8 shows a portion of the timer interrupt service routine.

Referring to FIG. 8 also upon passing a line tightness test 56 (FIG. 3), a day counter (DAY_CTR) is reset to zero (0). After the DAY_CTR is cleared, the DAY_CTR will continue to be increment every twenty-four (24) hours. Once the DAY_CTR equals a predetermined number of days, O_STAT is tested to determine if O_STAT equals two (2). If O_STAT equals two (2), then O_STAT is cleared. Clearing O_STAT removes the "past" signal from the leak monitor 14 (FIG. 1) notifying the operator, dispensing should be halted long enough for a line tightness test 56 to be performed. If the line tightness test 56 is passed within a predetermined number of days, periodic dispensing from the pressurized product line 26 (FIG. 1) can continue without the need to halt dispensing for performance of a line tightness test 56.

But if the line tightness test 56 is failed, the program does not immediately report the failure but determines there may be thermally induced pressure changes or a leak. A more detailed discussion of the software program including the program steps to distinguish whether a line tightness test 56 failure is caused by a leak or by thermally contraction of product follows.

In order to distinguish between a thermally induced pressure change and a leak, the line pressure probe 30 (FIG. 2) assumes that thermal contraction caused the line tightness test 56 failure, and proceeds to thermally stabilize the product line 26. Assuming thermal contraction eliminates the need to determine whether thermal contraction is occurring. Since there is no need to determine if thermal contraction is occurring, it is not possible to make a wrong determination of whether thermal contraction is occurring.

To thermally stabilize the product line 26, the line tightness test 56 is repeated a number of cycles to permit thermal stabilization of product 20. Each time the line tightness test 56 is repeated, the pump 28 (FIG. 1) is briefly activated for about ten (10) seconds by the line pressure probe 30 to pressurize the product line 26. If product 20 volume has decreased due to thermal contraction, additional product 20 will be added when the pump 28 operates. After the pump 28 has shut off, a hit counter 58 is incremented.

If the product line 26 pressure is not higher than a predetermined value, then the line tightness test 56 is once again failed and the line tightness test 56 will be repeated until a predetermined number of line tightness tests 56, contained in the maximum counter (MAX__HITS) have been completed.

Repressurizing the product line 26 upon the completion of each line tightness test 56 by the line pressure probe 30 is accomplished by: determining if the pump 28 is "on" or "off," if the pump 28 is "on," resetting test variables because product is being dispensed and upon completion of dispense restarting the test sequence; and, operating pump 28 for a period to repressurize product line 26 and if after the period is over and the pump 28 is "off" restarting the test sequence. A test sequence is initiated after the line pressure probe 30 detects a dispense has been completed.

If the line tightness test 56 is failed for the predetermined number of test cycles to permit thermal stabilization, then the test failure is reported. A line tightness test 56 failure after the predetermined number of test cycles, indicates a leak.

If the product line 26 pressure is higher than the predetermined value, then the line tightness test 56 is passed and the line pressure probe 30 will wait until the next time product 20 is dispensed to begin a new test sequence. If the line tightness test 56 is passed during the predetermined number of test cycles, then "pass" is reported and line tightness test 56 cycles are stopped even if the predetermined number of test cycles have not been completed.

At the end of a line tightness test 56 cycle, the following timer interrupt variables shown in FIGS. 5-8 are operated upon. The current result either a "pass" or "fail" is compared to the previous line tightness 56 test cycle result. If the current result and the previous result are the same, SEC__240 is set to a value of 240, and if the results were both "pass" the variables DAY__CTR, HOUR__CTR, and MIN__CTR are cleared. If the current result is different from the previous result, then SEC__240 is not changed. Also if O__STAT has a value of zero (0) indicating the test sequence has not been completed, then SEC__240 is also not changed.

A discussion of the probe timer interrupt routine as shown in FIGS. 5-8 follows. Probe timer interrupts occur approximately every twenty (20) milliseconds. The probe timer interrupt routine 62 contains program steps to determine if a line tightness test 56 (FIG. 4) has been passed within an established number of days. Determining if a line tightness test 56 has been passed within a predetermined number of days, comprises the steps of: resetting selected counters (SEC__CTR1, MIN__CTR, HOUR__CTR, and DAY__CTR) to zero each time a line tightness test 56 is passed; and, removing "pass" status from a display if at the end of the predetermined number of days a line tightness test 56 has not been passed notifying the operator, dispensing should be halted long enough for a line tightness test 56 to be performed. If the line tightness test 56 is passed within a predetermined number of days, periodic product 20 dispensing can continue without the need to halt dispensing for performance of a line tightness test 56.

The probe 30 timer interrupt begins by servicing a watchdog timer 60. The watchdog timer 60 is a Maxim integrated circuit part no. MAX690EPA, available from Maxin Integrated Products, 120 San Gabriel Drive, Sunnyvale, Calif. 94086-9892. If the watchdog timer 60 is not serviced within a predetermine amount of time by the probe timer interrupt routine, the watchdog timer 60 will reset the probe's microprocessor 34 (FIG. 2) assuming that a malfunction has occurred.

The probe timer interrupt 62 first determines if the line pressure probe 30 was addressed by the controller 14. If the probe 30 is not addressed by the controller 14, the timer interrupt 62 routine will clear the probe's 30 output statuses and go to label TIMER5A. If the probe 30 is addressed, the timer interrupt 62 routine will determine if the probe 30 was addressed the last time the probe timer interrupt 62 occurred. If the probe 30 was not addressed the last time the probe timer interrupt 62 occurred, second counter two (SEC__CTR2) is cleared. If the probe 30 was addressed, SEC__CTR2 is tested to determine if it is less than a predetermined time period such as 700 milliseconds or thirty-five (35) timer interrupts.

If the probe 30 was addressed by the leak monitor 14 (FIG. 1) and SEC__CTR2 is less than thirty-five (35) timer interrupts, then the probe 30 output to the leak monitor 14 is set to "oil" and the program next goes to label TIMER5A. If the probe 30 was addressed by the leak monitor 14 and SEC__CTR2 is not less than thirty-five (35), then SEC__CTR2 is tested to determine if it is greater than or equal to sixty-five (65). If SEC__CTR2 is not greater than or equal to sixty-five (65), then output of the probe 30 to the leak monitor 14 is set to "dry" and the timer interrupt 65 routine goes to label TIMER5A.

If SEC__CTR2 is greater than or equal to sixty-five (65), then the timer interrupt 65 routine then determines whether a four minute timer (SEC__240) is greater than zero (0). If SEC__240 is greater than zero (0), the probe 30 output to the leak monitor 14 is cleared and the timer interrupt 65 goes to label TIMER5A. If SEC__240 is equal to zero (0), then the timer interrupt 65 examines variable oil status (O__STAT) where the result of the previous test sequence is stored. Depending upon the value of O__STAT, the timer interrupt 65 routine sets the output from the probe 30 to the leak monitor 14 to the appropriate status of either NONE, DRY, OIL, or OIL&DRY. Then at label TIMER5A, the 20 millisecond timer (T1SEC) and SEC__CTR2 are incremented. Next, the line pressure probe 30 tests to determine if the T1SEC equals fifty (50) interrupts or one (1) second. If T1SEC is less than fifty (50) interrupts, then the timer interrupt 65 routine is exited and the main probe program (FIGS. 3 and 4) is reentered at the point the main probe program (FIGS. 3 and 4) was exited to perform the timer interrupt 65 routine. If T1SEC is equal to or greater than fifty (50) interrupts, then T1SEC is cleared and the following counters are incremented SEC__CTR, SEC__CTR1, SEC__CTR3, and CURRENT__TIME. The four minute timer (SEC__240) is tested to determine if it is greater than zero (0). If SEC__240 is greater than zero (0), then SEC__240 is decremented; otherwise, the code bypasses the SEC__240 decrement step and continues the timer interrupt 65 program.

Second counter one (SEC__CTR1) is tested to determine if SEC__CTR1 equals sixty (60). If SEC__CTR1 equals sixty (60), then SEC__CTR1 is cleared, MIN__CTR, MIN__CTR1, TST__TIME, and TOTAL__TIME are incremented.

Next the probe timer interrupt 65 test to determine if minute counter MIN__CTR equals sixty (60). If MIN__CTR does not equal sixty (60), then program flow returns to main probe program (FIGS. 3 and 4) at the location from which the main probe program (FIGS. 3 and 4) was exited when the timer interrupt 65 occurred. If MIN_CTR does equal sixty (60), then the hour counter is incremented and MIN_CTR is cleared.

Figure 3:
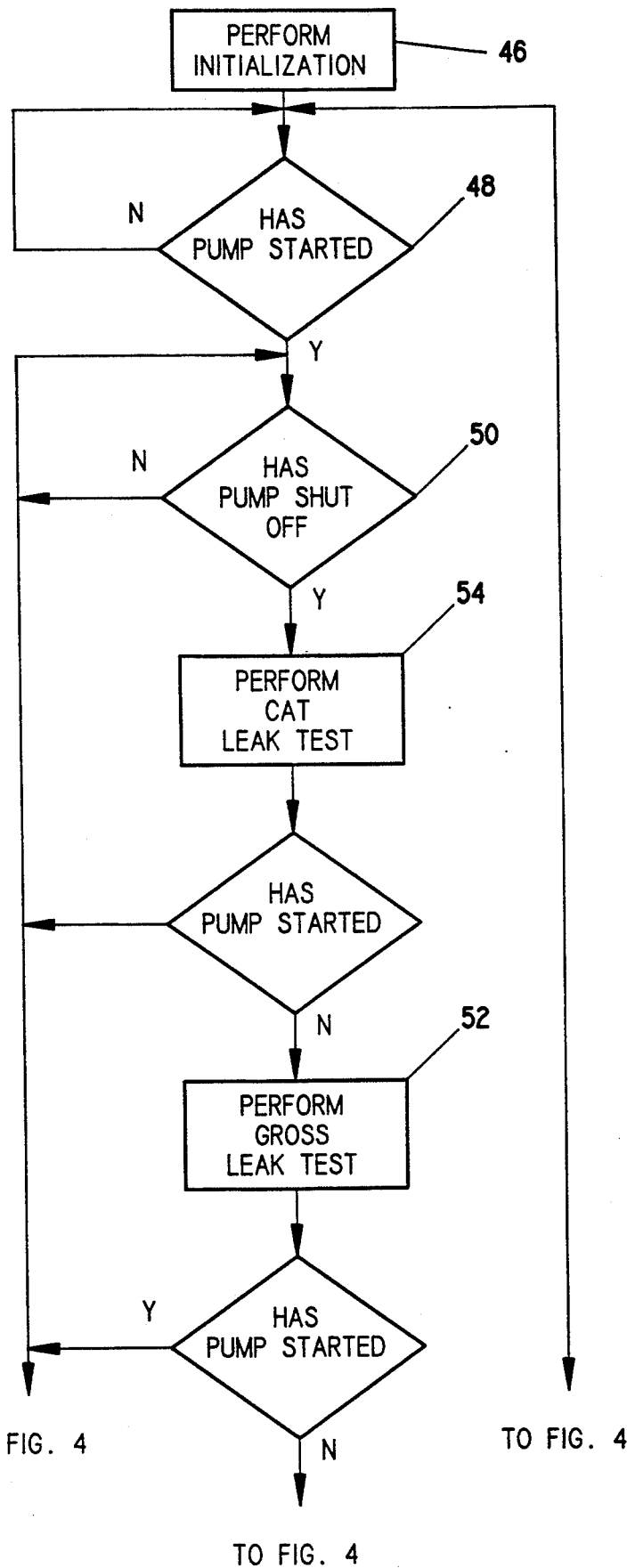
FIG. 3 shows a flowchart for preventing thermally induced false alarms during a line tightness test.
Figure 4:
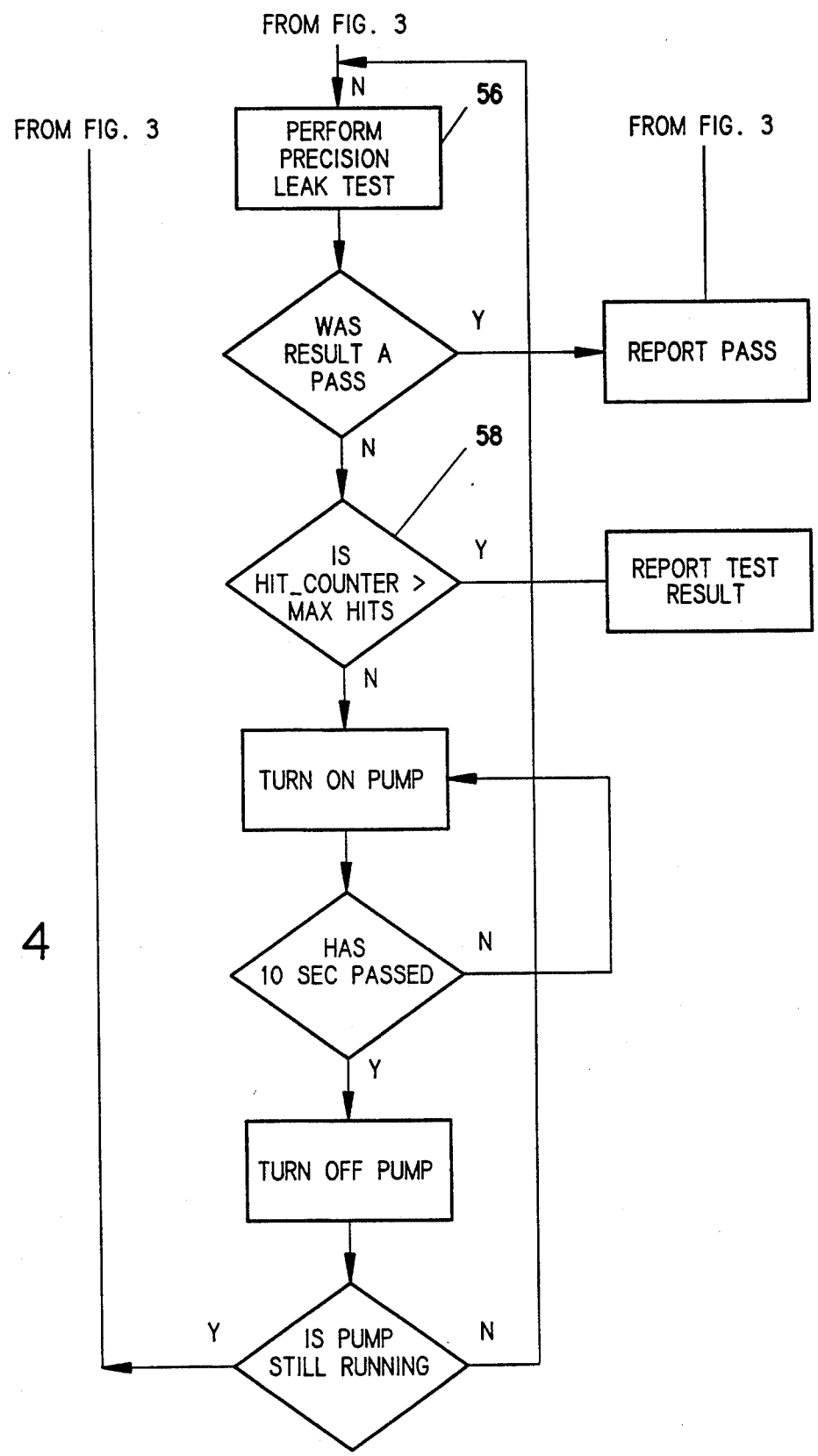
FIG. 4 shows a flowchart for determining if a line tightness test has been passed within a predetermined number of days.
Figure 5:
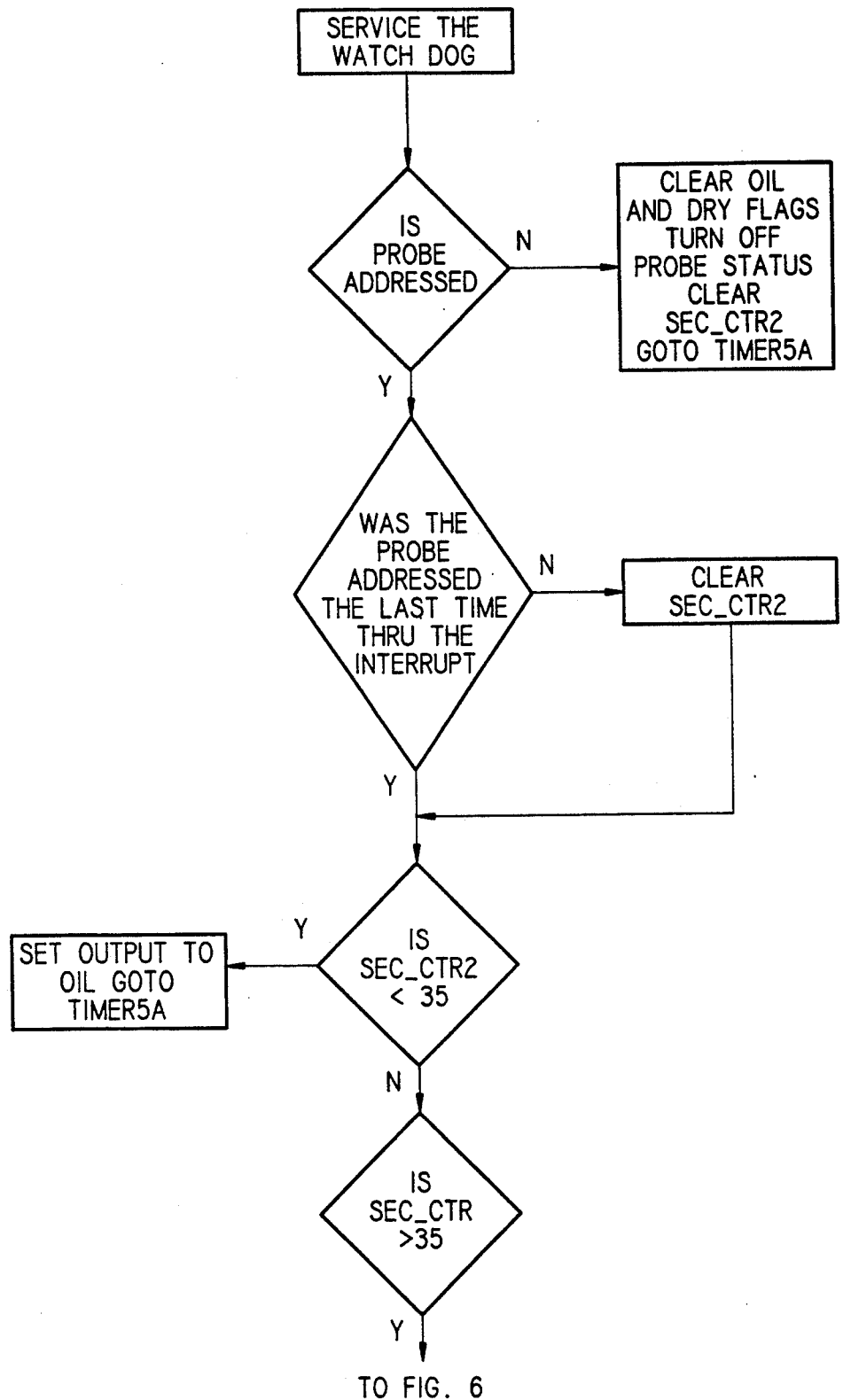
FIG. 5 shows a portion of a timer interrupt service routine.
Figure 6:
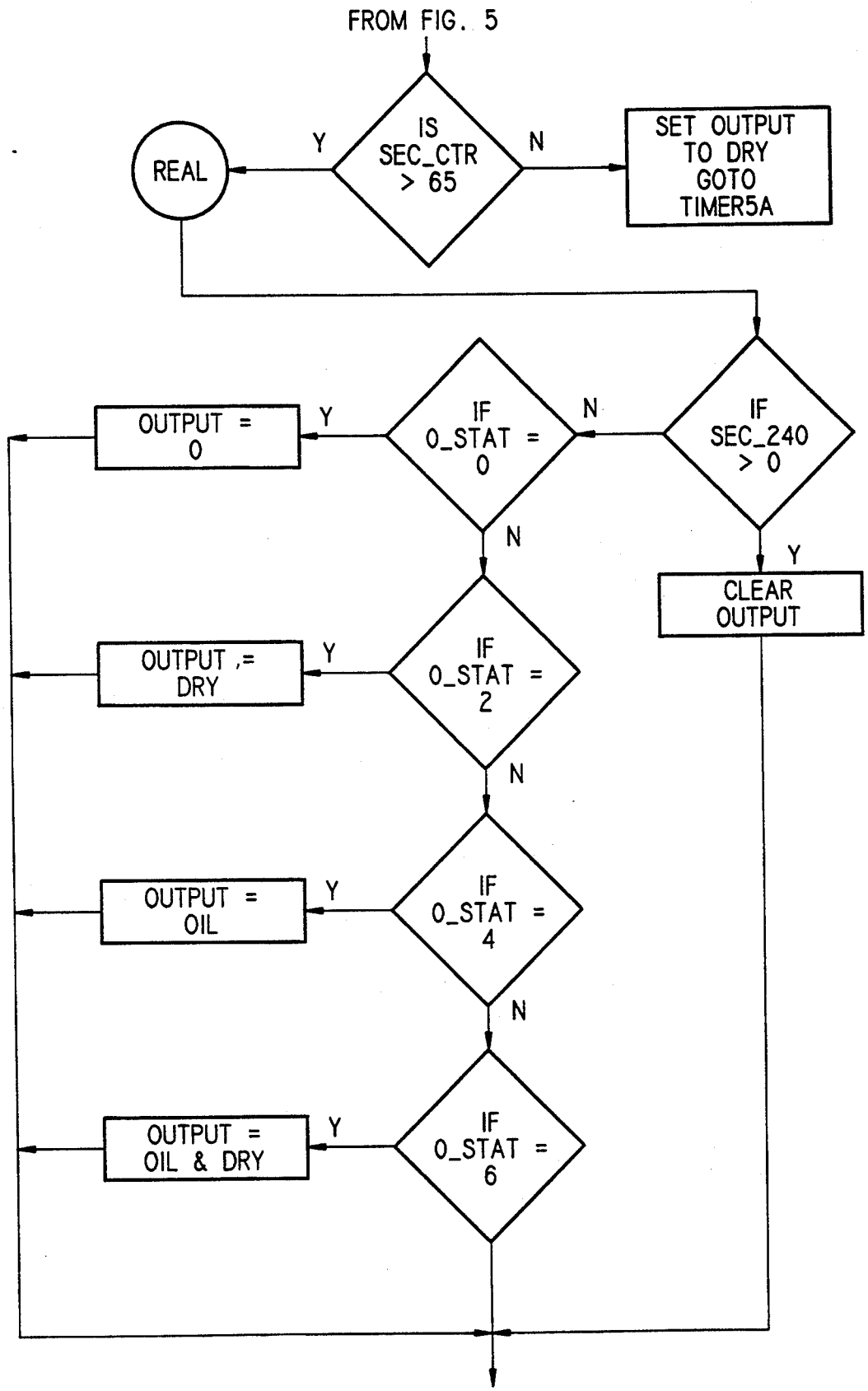
FIG. 6 shows a portion of the timer interrupt service routine.
Figure 7:
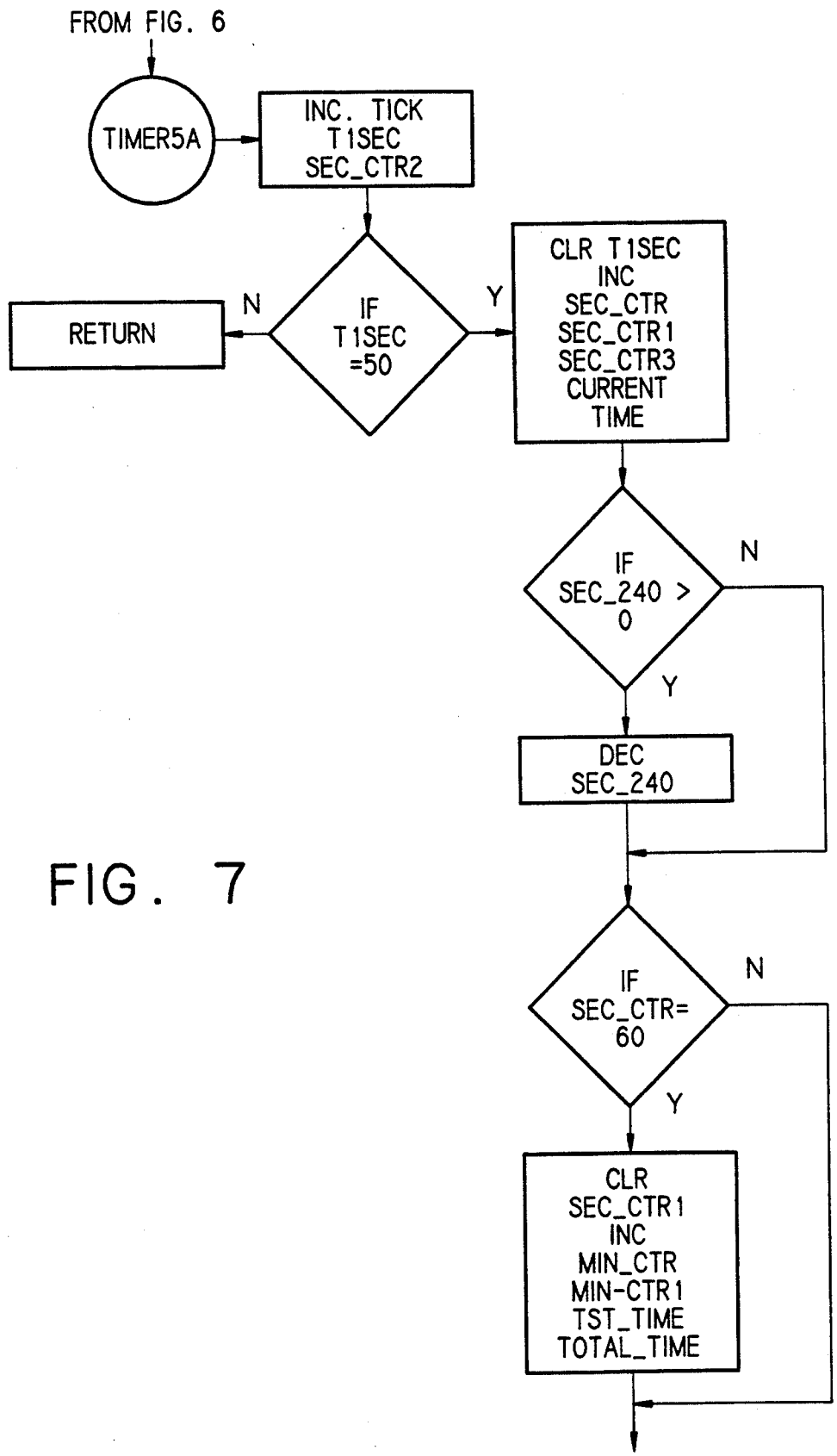
FIG. 7 shows a portion of the timer interrupt service routine.

Next, the probe timer interrupt 65 tests to determine if hour counter (HOUR_CTR) is equal to twenty-four (24). If HOUR_CTR does not equal twenty-four (24) return to main probe program (FIGS. 3 and 4). If hour counter does equal twenty-four (24), day counter DAY_CTR is incremented and hour counter is cleared.

Next, the probe timer interrupt 65 tests to determine if the DAY_CTR is equal to the predetermined number of days. If the DAY_CTR is not equal to the predetermined number of days, then return to the main probe program (FIGS. 3 and 4). If the DAY_CTR is equal to the predetermined number of days, then test O_STAT to determine if O_STAT equals pass. If O_STAT equals pass, clear O_STAT and return to the main probe program (FIGS. 3 and 4). If O_STAT does not equal pass then return to the main probe program (FIGS. 3 and 4).

The following decision criteria table displays product line conditions and line pressure probe responses to those conditions.

| DECISION CRITERIA TABLE | |
|---|---|
| PRODUCT LINE CONDITION | PROBE RESPONSE |
| Thermal condition unknown (assume thermal contraction) and the pressure has dropped below the threshold. | Turn on pump if the maximum cycles have not been completed, otherwise report result. |
| Thermal condition unknown (assume thermal contraction) and the pressure has not dropped below threshold. | Report "pass". |

The following portion of the disclosure of this patent document contains material subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

Probe Line Tightness Test improvements Psudo Code, (c) 1991 Emerson Electric Co. written in "C" for a Motorola microprocessor part no. 68HC705C4CFN:

| PSUDO CODE TABLE |
|---|
| If result this test = pass |
|    report pass |
|    return to top of code |
| Else if his counter > max hits and result this test = fail |
|    report fail |
|    return to top of code |
| Turn on pump |
| Delay |
| Turn off pump |
| If the pump turns on |
|    abort test |
|    reset counters |
|    return to top of code |

| PSUDO CODE TABLE -continued |
|---|
| If the pump is off |
|    increment the hit counter |
|    return to top of test |

The previously described versions of the present invention have many advantages, including: thermally stabilizes a liquid product line 26 for more accurate test results, provides the line pressure probe 30 with the capability to directly control the pump 28 to thermally stabilize the liquid product line 26.

Although the present invention has been described in considerable detail with reference to certain preferred versions thereof, other versions are possible. Therefore, the spirit and scope of the appended claims should not be limited to the description of the preferred versions contained herein.

I claim:

1. A line pressure probe for use in a liquid storage and dispensing system, the line pressure probe comprising:
   (a) a pressure transducer for providing an electrical signal representative of the pressure in a liquid conduit;
   (b) digital storage means for storing a plurality of decision criteria related to conditions of said liquid storage and dispensing system and the pressure in the conduit;
   (c) digital logic means responsive to the pressure signal and communicating with the digital storage means for providing an output signal indicative of one or more conditions of said liquid storage and dispensing system relative to the pressure signal;
   (d) probe housing for enclosing the pressure transducer, digital storage means and digital logic means including means for attaching the probe housing to a liquid conduit with the pressure transducer responsive to the pressure of the liquid in the conduit; and, a signal path for exclusively connecting the digital logic means to a pump relay, so the digital logic means directly activates a pump to pressurize the liquid conduit.

2. The line pressure probe as recited in claim 1 wherein the digital logic means directly activates a pump to repressurize the liquid conduit to compensate for thermal contraction.

3. The line pressure probe as recited in claim 2 wherein when the liquid conduit is repressurized and the line pressure probe performs a line tightness test.

4. The line pressure probe as recited in claim 3 wherein the probe determines whether to repressurize the liquid conduit upon completion of a line tightness test by:
   (a) determining if the pump is "on" or "off", if the pump is "on", reset line tightness test variable because product is being dispensed and upon completion of product being dispensed restarting the line tightness test sequence; and,
   (b) operating the pump for a period to repressurize the liquid conduit and if after the period is over the pump it "off" restart the line tightness test sequence.

* * * * *